July 31, 1934.　　　V. G. APPLE　　　1,968,588
VEHICLE BRAKE
Original Filed Nov. 2, 1929　　2 Sheets-Sheet 1

INVENTOR.
Vincent G. Apple
BY Burton & McConkey
ATTORNEYS

July 31, 1934.    V. G. APPLE    1,968,588
VEHICLE BRAKE
Original Filed Nov. 2, 1929    2 Sheets-Sheet 2

INVENTOR.
Vincent G. Apple
BY Burton & McConkey
ATTORNEYS

Patented July 31, 1934

1,968,588

UNITED STATES PATENT OFFICE 1,968,588

VEHICLE BRAKE

Vincent G. Apple, Dayton, Ohio, assignor to Bendix Brake Company, South Bend, Ind., a corporation of Illinois Application November 2, 1929, Serial No. 404,240
Renewed July 15, 1933

14 Claims. (Cl. 188—163)

My invention relates to brakes and has particular reference to automotive vehicle brakes wherein power means controlled by the vehicle operator is utilized to force the friction means into contact with the rotating drum for the purpose of retarding rotation thereof.

An object of my invention is to adapt a completely enclosed water and dirt proof brake mechanism along with electro-magnetic means for actuating the same. The brake structure resembles that disclosed in my copending application Serial Number 404,233, filed November 2, 1929, and the solenoid structure resembles that there disclosed except that the plunger is arranged to operate in the reverse direction to apply the brakes and the entire assembly is adapted for use in connection with a ¾ floating rear axle.

Another object of this invention is to secure the torque plate hub, upon which the brake and power mechanism are secured against rotation within the drum, to the tubular spindle which houses the rear axle in a simpler and more efficient manner.

Figure 1:
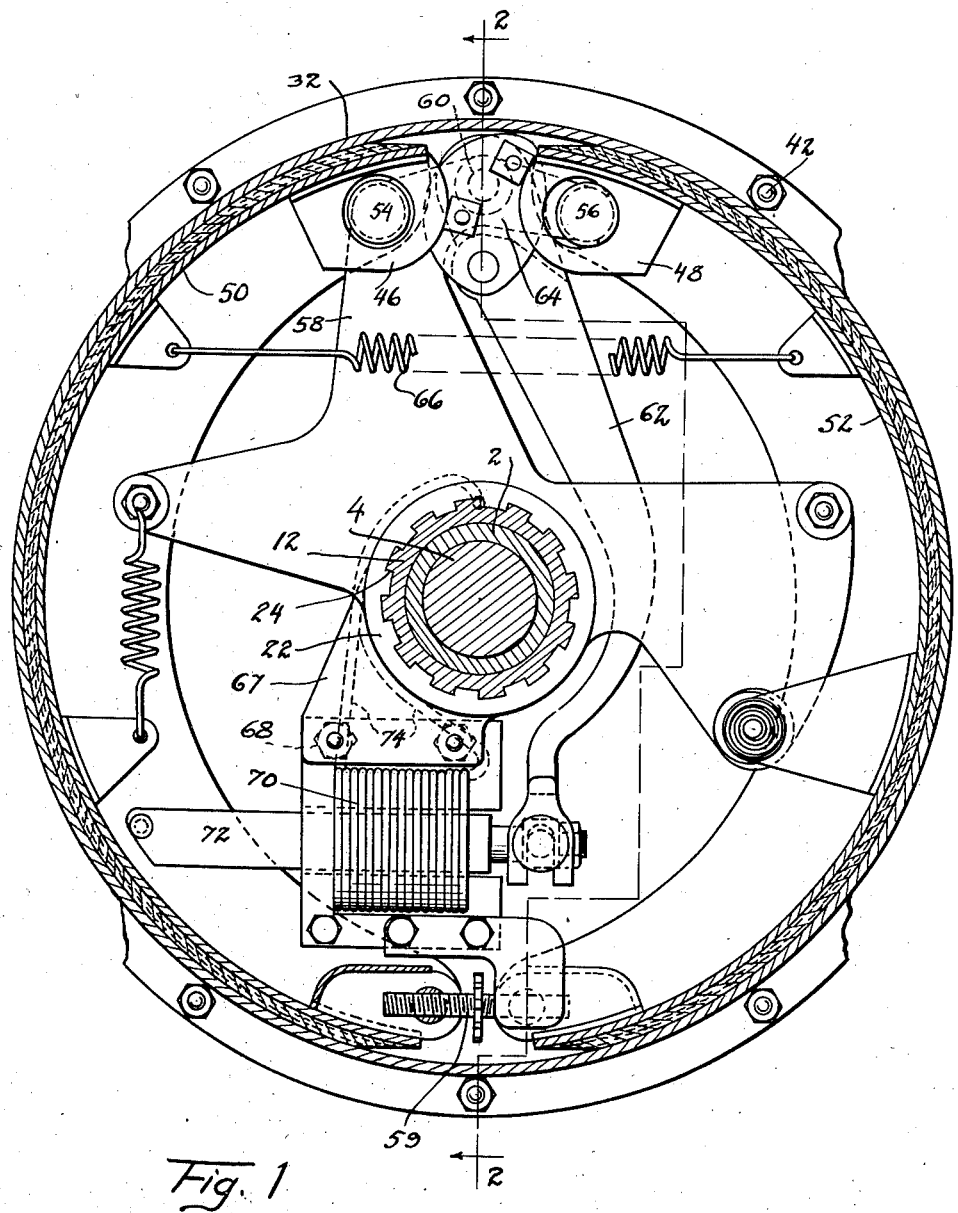
Figure 2:
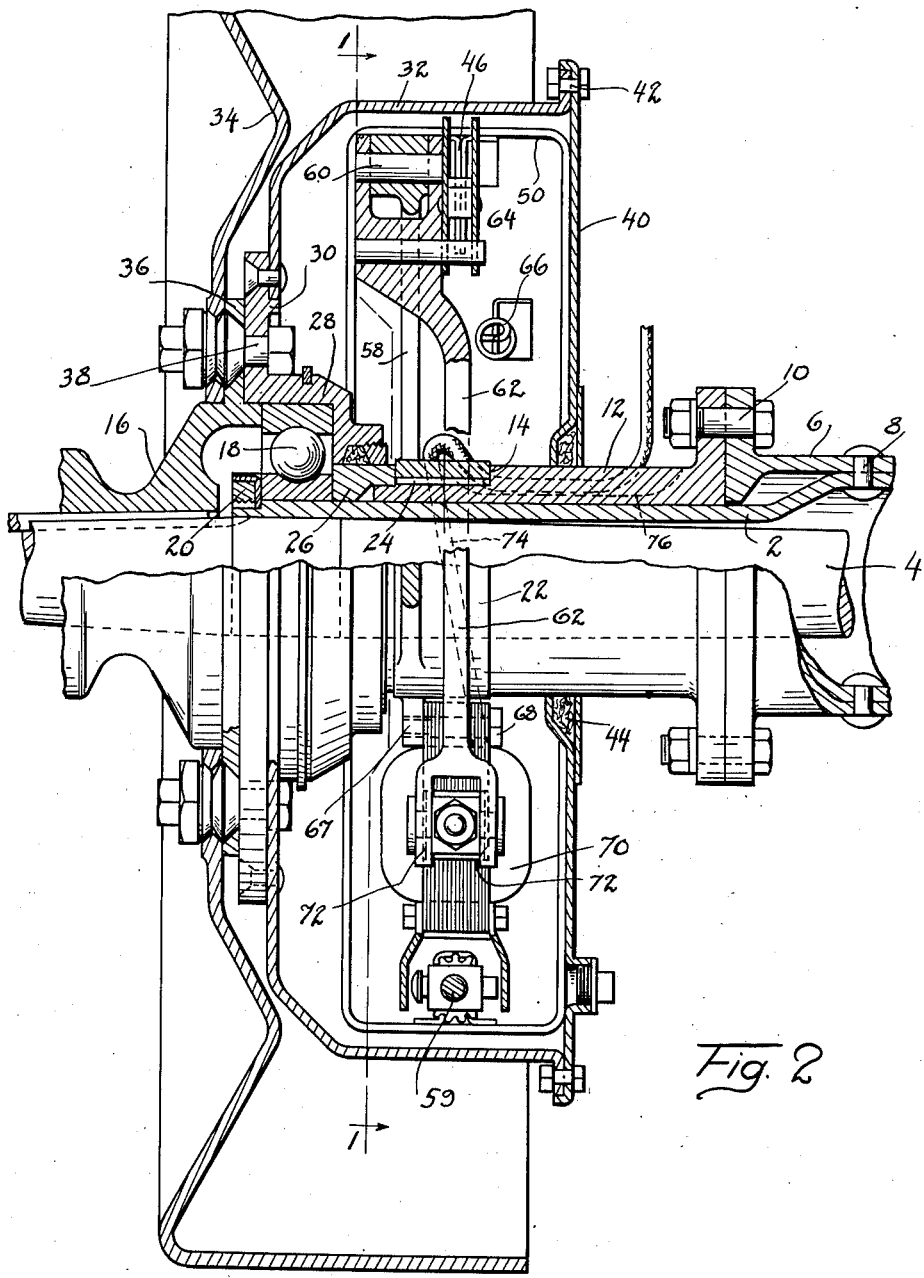

Further objects will be apparent from the following description, illustrated by the accompanying drawings wherein like numerals refer to like parts throughout the several figures, and wherein Fig. 1 is a transverse section taken on the line 1—1 of Fig. 2, and Fig. 2 is a vertical axial section taken on the line 2—2 of Fig. 2.

Numeral 2 in the drawings represents the tubular spindle which houses the rear axle 4. This spindle is provided with a reinforcing member 6 which is riveted thereto at 8. Secured to the member 6 by the bolt 10 is a sleeve 12 which extends axially outward along the spindle 2 and which is provided with a shoulder 14 at a point intermediate the ends thereof.

The wheel hub 16 is keyed to the outer end of the axle 2 and is journaled on the axle housing or spindle 2 by means of the bearing 18 which is held securely on the spindle by the nut 20. A torque plate 22 is splined on the sleeve 12 as at 24, and is held tight against the shoulder 14 thereof by the action of the nut 20 through the bearing 18 and the spacing member 26 adjacent thereto. The bearing housing 28 is provided with a radially extending flange 30 to which is riveted the brake drum 32, and these two, together with the wheel 34, are secured to a flange 36 on the rotatable hub 16 by means of the bolts 38.

The cover plate 40 is bolted as at 42 to the open inner end of the brake drum 32 and is provided with a central aperture around which extends a housing for the packing washer 44. Thus I have provided a completely enclosed brake drum assembly which fits snugly about the tubular spindle 2 and thereby protects the brake shoes and actuating mechanism therefore from dirt, water, and such other foreign matter as will usually accumulate and impede the efficient operation of the brakes.

The brake torque plate 22 is provided with a plurality of arms which extend radially outward within the drum enclosure. Adjacent flanged ends 46 and 48 of conventional brake shoes 50 and 52 are anchored by means of the studs 54 and 56 which are carried by the torque plate arm 58. The other adjacent ends of the brake shoes are connected by the right and left adjusting screw 59. A third stud 60 is also carried by the arm 58 and provides a fulcrum for the brake operating lever 62 to which is pivoted the camming mechanism broadly indicated at 64, since it forms no part of my present invention. The brake shoes have been illustrated in their full "on" position and the customary retraction spring 66 is secured at each end to one of the shoes for the purpose of withdrawing them from their expanded position whenever the force actuating the lever 62 to operate the camming mechanism 64 has been withdrawn.

Attached to the downwardly extending arm 67 of the brake torque plate 22 by means of the cap screws 68 is a solenoid device generally indicated by the numeral 70 and described in detail in my copending application Serial Number 404,233, filed November 2, 1929. The armature core is built up of a plurality of laminae which are compacted between the plates 72, and when the field is energized the core is drawn into the position illustrated in Fig. 1, wherein the brakes are in their full applied position.

The conductor cables 74 are led into the drum enclosure through the conduits 76 extending longitudinally of the sleeve number 12.

Having illustrated and described a single modification of my invention, other modifications will be apparent to those skilled in the art and I therefore intend to limit myself only within the scope of the appended claims.

I claim:

1. Brake mechanism comprising in combination a tubular axle housing, a sleeve secured to said housing and provided with a shoulder intermediate its ends, a torque plate splined thereto and abutting said shoulder, expansible friction means and a solenoid supported by said torque plate, and operative connections between the solenoid and the friction means.

2. In combination with internal expanding brake mechanism, a tubular axle housing, a sleeve secured to said housing having a shoulder intermediate its ends, a torque plate splined thereto, a bearing housing secured to the end of the axle housing and acting through a spacing member to force the torque plate against said shoulder.

3. Brake mechanism comprising in combination a tubular axle housing, a sleeve secured thereto having a shoulder intermediate its ends, a torque plate splined to said sleeve and having radially extending arms, expansible friction means and a solenoid for expanding them supported by said arms, and a bearing housing secured to the end of the axle housing and operating through a spacing member to force the torque plate against said sleeve shoulder.

4. Brake mechanism comprising in combination a tubular axle housing, a sleeve secured thereto having a shouldered portion intermediate its ends, a torque plate splined thereto abutting said shouldered portion, a bearing housing secured to the end of the axle housing, a closed brake drum rotatably journalled thereon, and means to prevent axial movement of said torque plate.

5. In combination with a fixed spindle, an integral closed drum rotatably journaled thereon, a sleeve fixedly positioned with reference to said spindle and extending from the exterior to the interior of said drum, a torque plate including a hub portion secured to said sleeve co-axially therewith, and retarding mechanism positioned by said torque plate operable upon said drum.

6. Mechanism of the class described including, in combination, a wheel supporting axle swaged inwardly adjacent one extremity, a reinforcing member secured to the unswaged portion of said axle and projecting over the swaged portion thereof, a sleeve positioned over the swaged portion of the axle and secured against rotation by said reinforcing member, said sleeve terminating short of the end of said axle, and a brake drum rotatably journalled at each end upon the exposed end of the axle and the sleeve respectively.

7. Mechanism of the class described including, in combination, a wheel supporting axle swaged inwardly adjacent one extremity, a reinforcing member secured to the unswaged portion of said axle and projecting over the swaged portion thereof, a sleeve positioned over the swaged portion of the axle and secured against rotation by said reinforcing member, said sleeve terminating short of the end of said axle, and a brake drum closed at each end journaled about said axle, said drum having its respective closed ends rotatably supported upon the exposed end of said axle and said sleeve, said sleeve including an axial passage extending through the wall thereof to permit the introduction of an electric cable into said closed drum.

8. Braking mechanism comprising, a non-rotatable axle, a rotatable brake drum completely closed at its ends and supported for rotation about said axle, brake friction means and an electro-magnet supported against rotation within the drum enclosure by means extending from said axle, an armature adapted to be drawn within said electro-magnet and operably connected through a moment arm greater than the radius of said drum to the friction means to apply the same to said drum and resilient means adapted to return said armature to release said brake from said drum.

9. Brake mechanism including, in combination, a rotatable brake drum completely closed at both ends, expansible brake friction means supported against rotation within the drum, a solenoid secured against rotation adjacent one periphery of the friction means and having its armature movable transversely to the axis of the drum, actuating means for expanding the friction means secured adjacent an opposite periphery of the drum, and a lever providing a moment arm greater than the radius of said drum connecting said armature and said actuating means.

10. Brake mechanism including in combination, non-rotating radially expansible brake shoes channel shaped in cross section, cam means adjacent a periphery of the shoes for expanding them, an electro magnet having an armature movable in a direction transverse to the axis of the drum and extending into close proximity of the shoes intermediate the flanges thereof and a connecting arm between said cam means and said armature.

11. Brake mechanism comprising, in combination, a non-rotatable tubular axle swaged adjacent to one end, a reinforcing member secured to said axle member and having a portion protruding beyond the swaged portion thereof, an axle member mounted on said tubular axle and keyed to said protuberance, a brake drum rotatably supported on said tubular axle and an electric motor and brake friction means supported by the axle within the drum.

12. Brake mechanism comprising in combination a non-rotatable tubular axle spindle swaged at one end, a reinforcing member secured to said spindle and having a portion protruding beyond the swaged portion thereof, an axle member mounted on said spindle and secured to said protrusion, a brake drum rotatably mounted on said spindle, and friction applying means supported within the drum by said axle member.

13. In combination with an axle housing, a reinforcing sleeve secured thereto intermediate its extremities, an axle member positioned about said housing adjacent the extremity thereof and secured against rotation by said reinforcing member, a wheel and drum assembly rotatably journaled upon said axle member, and retarding mechanism positioned within said drum by said axle member.

14. In combination with an axle housing, a flanged axle member fixedly positioned about said axle housing, and a closed drum rotatably journaled about one end of said axle member, said axle member having an aperture extending therethrough from a point outside the drum to the interior thereof.

VINCENT G. APPLE.

CERTIFICATE OF CORRECTION.

Patent No. 1,968,588. July 31, 1934.

VINCENT G. APPLE.

It is hereby certified that error appears in the printed specification of the above numbered patent requiring correction as follows: Page 2, line 116, claim 11, after "axle" insert the word member; and that the said Letters Patent should be read with this correction therein that the same may conform to the record of the case in the Patent Office.

Signed and sealed this 19th day of March, A. D. 1935.

Leslie Frazer (Seal) Acting Commissioner of Patents.